United States Patent
Weerawarana et al.

(10) Patent No.: US 6,779,172 B1
(45) Date of Patent: Aug. 17, 2004

(54) BEAN SCRIPTING FRAMEWORK

(75) Inventors: Sanjiva Weerawarana, Yorktown Heights, NY (US); Matthew J. Duftler, Tarrytown, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/425,726

(22) Filed: Oct. 22, 1999

(51) Int. Cl.[7] .............................................. G06F 9/44
(52) U.S. Cl. ........................ 717/115; 717/107; 717/108; 717/118; 719/320
(58) Field of Search ................................ 717/115, 118, 717/107–120, 100; 719/318–320

(56) References Cited

U.S. PATENT DOCUMENTS

| | | | | |
|---|---|---|---|---|
| 6,078,743 A | * | 6/2000 | Apte et al. ................... | 717/102 |
| 6,237,135 B1 | * | 5/2001 | Timbol ........................ | 717/115 |
| 6,256,772 B1 | | 7/2001 | Apte et al. | |
| 6,289,395 B1 | * | 9/2001 | Apte et al. ................... | 709/318 |
| 6,292,936 B1 | * | 9/2001 | Wang ........................... | 717/115 |
| 6,662,236 B1 | * | 12/2003 | Apte et al. ................... | 719/320 |

OTHER PUBLICATIONS

Herbal–T Enabling Integration, Interoperability, and Reusability of Internet Components, Israel Hilerio and Weidong Chen, © 1999 pp. 49–58.*

* cited by examiner

*Primary Examiner*—Tuan Dam
*Assistant Examiner*—Chuck Kendall
(74) *Attorney, Agent, or Firm*—Whitham, Curtis & Christofferson, P.C.; Stephen C. Kaufman (57) ABSTRACT

This invention provides a system and method that allows object oriented (OOP) applications to incorporate scripting easily and in a uniform manner. The Bean Scripting Framework (BSF) supports scripting on the OOP programming language-side, where the programming language runs and evaluates scripts, and also in cases where scripts run and control objects. The BSFManager provides scripting services for the application program as well as support services for scripting engines to interact with the OOP programming language runtime environment. The BSF also has a registry of known scripting languages which the application program can interact with. The scripting architecture allows OOP programming language applications to be customized and managed further downstream than previously possible.

17 Claims, 9 Drawing Sheets

BEAN SCRIPTING FRAMEWORK

BACKGROUND OF THE INVENTION

1. Field of the Invention

The present invention generally relates to Computer Aided Software Engineering (CASE) and, more particularly, a method for incorporating scripting into object oriented programming (OOP) applications and small programs called applets.

2. Background Description

OOP is the preferred environment for building user-friendly, intelligent computer software. Key elements of OOP are data encapsulation, inheritance and polymorphism. These elements may be used to generate a graphical user interface (GUI), typically characterized by a windowing environment having icons, mouse cursors and menus. While these three key elements are common to OOP languages, most OOP languages implement the three key elements differently.

Examples of OOP languages are Smalltalk, Object Pascal, C++, and Java. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself Messages perform a task similar to that of function calls in conventional programming languages. The programmer does not need to be concerned with the type of data; rather, the programmer need only be concerned with creating the right order of a message and using the right message. Object Pascal is the language used for Apple's Macintosh® computers. Apple developed Object Pascal with the collaboration of Niklaus Wirth, the designer of Pascal. C++ was developed by Bjame Stroustrup at the AT&T Bell Laboratories in 1983 as an extension of C. Java, which was modeled after C++, was originally developed in 1991 as a language for embedded applications such as those used in set-top boxes and other consumer-oriented devices. In 1994, Sun Corp. transitioned Java to the World Wide Web. The key concept of Java and C++ is class, which is a user-defined type. Classes provide object oriented programming features. C++ modules are compatible with C modules and can be linked freely so that existing C libraries may be used with C++ programs. The most widely used object based and object oriented programming languages trace their heritage to Simula developed in the 1960s by O-J. Dahl, B. Myhrhaug and K. Nygard of Norway. Further information on the subject of OOP may be had by reference to *Object Oriented Design with Applications* by Grady Booch, The Benjamin/Cummings Publishing Co., Inc., Redwood City, Calif. (1991).

Scripting is a method of writing a computer "program" that is easy and really does not require programming knowledge. A script is a type of program that consists of a set of instructions to an application or utility program. A script usually consists of instructions expressed using the rules and syntax of the application, combined with simple control structures such as loops and if/then expressions. A scripting language is a scripting style programming language implemented in Java or non-Java. Scripting languages such as Netscape Rhino (JavaScript), VBScript, Perl, Tcl, Python, NetRexx and Rexx are commonly used to augment the function of an application or to script together a set of application components to form an application. Rapid development is one reason for using a scripting language.

The Java platform currently does not have a well-defined scripting architecture that allows Java applications to incorporate scripting easily and in a uniform manner. The use of scripting will become even more important as scripting is fast becoming the next wave of software development. There are many advantages of having a standard scripting architecture. First, adopting a scripting architecture instead of an ad hoc approach to script integration and enabling allows applications to quickly and easily support many scripting languages. Script enabling products allows extensions to be written by a wider audience that includes non-programmers. Second, having a single scripting architecture for the platform enables scripting language developers to conform to the architecture once and be universally available to all applications. Finally, common services such as debugging services, which support all scripting languages can be developed.

SUMMARY OF THE INVENTION

It is therefore an object of the present invention to provide a method and system for incorporating scripting into Java applications and applets.

It is yet another object of the present invention to provide a method and system that allows the functionality of an application to be modified or enhanced.

The Bean Scripting Framework (BSF) is an architecture for incorporating scripting into Java applications and applets. The BSF provides a set of interfaces that let developers add language-independent scripting to their applications. The invention incorporates scripting into Java applications by using two main components, the BSFManager, and scripting engines.

The BSFManager lets end users write scripts in the scripting languages they like best without burdening the application with language specific knowledge. The BSF-Manager supports both directions of scripting; that is, when the Java-side is in charge and runs and evaluates scripts at will, as well as cases where the script runs and controls Java beans.

A scripting engine is a scripting language that has been integrated into the BSF. The scripting engines therefore deal with all language-dependent issues. A scripting engine must be written for each scripting language that the BSFManager supports, although to the scripting host, they all look the same. Thus, scripting engines may be provided for JavaScript, NetRexx, Jacl, JPython, VBScript, JScript, LotusXSL, LotusScript and other languages.

The BSF works with any Java object, and not just a true bean. Script enabling Java applications enables those applications to be customized and managed further downstream than previously possible. That is, currently, once a Java application is built and delivered to an end-user or an Independent Software Vendor (ISV), they cannot modify or add to the functionality of the application conveniently. Some applications allow this by having precise extensiblity Application Programming Interfaces (APIs) which ISVs may use. However, ISVs must also use Java in that case to customize the applications. If the application used BSF, then it can expose the appropriate functionality for extensiblity via BSF. ISVs and others may then configure and modify the application using any BSF-supported scripting language. There are two significant advantages with this approach. First, application customization can be done with the customizer's language of choice (assuming it is supported by BSF). Second, the application does not need to do any additional work to support all the BSF-enabled languages.

That is, the application becomes scriptable from all the BSF languages without any application burden.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The detailed description is provided in terms of an implementation in the Java programming language. However, the invention can also be practiced using other suitable programming languages.

Figure 1:
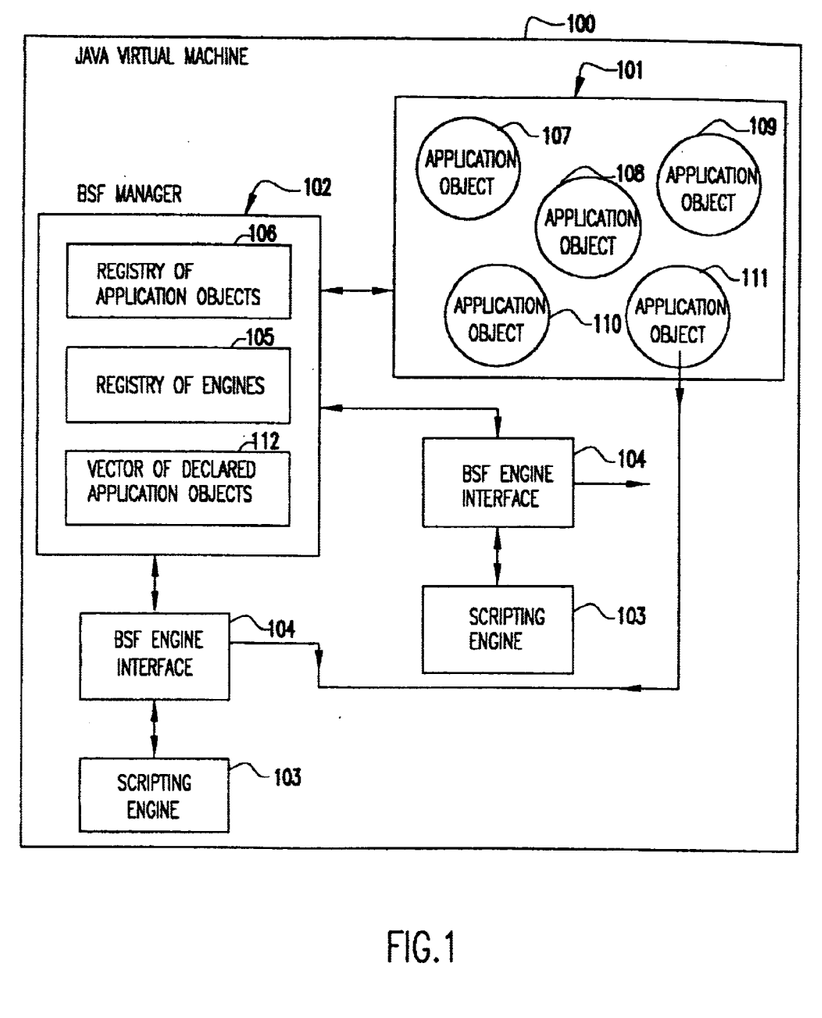
FIG. 1 is a block diagram illustrating the principal components of the preferred embodiment of the present invention when the scripting engine is implemented in Java.

FIG. 1 is a block diagram illustrating the principal components of the preferred embodiment of the present invention when the scripting engine is implemented in Java. As shown in FIG. 1, all of the objects of the application are found within a Java Virtual Machine (JVM) 100 in this case. As will be understood to those skilled in the art, a JVM is a Java interpreter that converts the Java intermediate language (byte code) into machine language one line at a time and then executes it. The BSFManager 102 is an object that provides scripting services for the application 101, as well as support services for the scripting engines 103 that deal with all language-dependent issues to interact with application objects (107, 108, 109, 110, 111) and the Java runtime environment. The BSFManager 102 has a scripting engine registry 105 of scripting engines 103 that the application 101 can load and interact with. Scripting engines 103 may include, for example, JavaScript, Perl, and others. The BSFManager 102 also has an object registry of application objects (107, 108, 110, 111) that the application 101 has chosen to make available for scripting.

Figure 2:
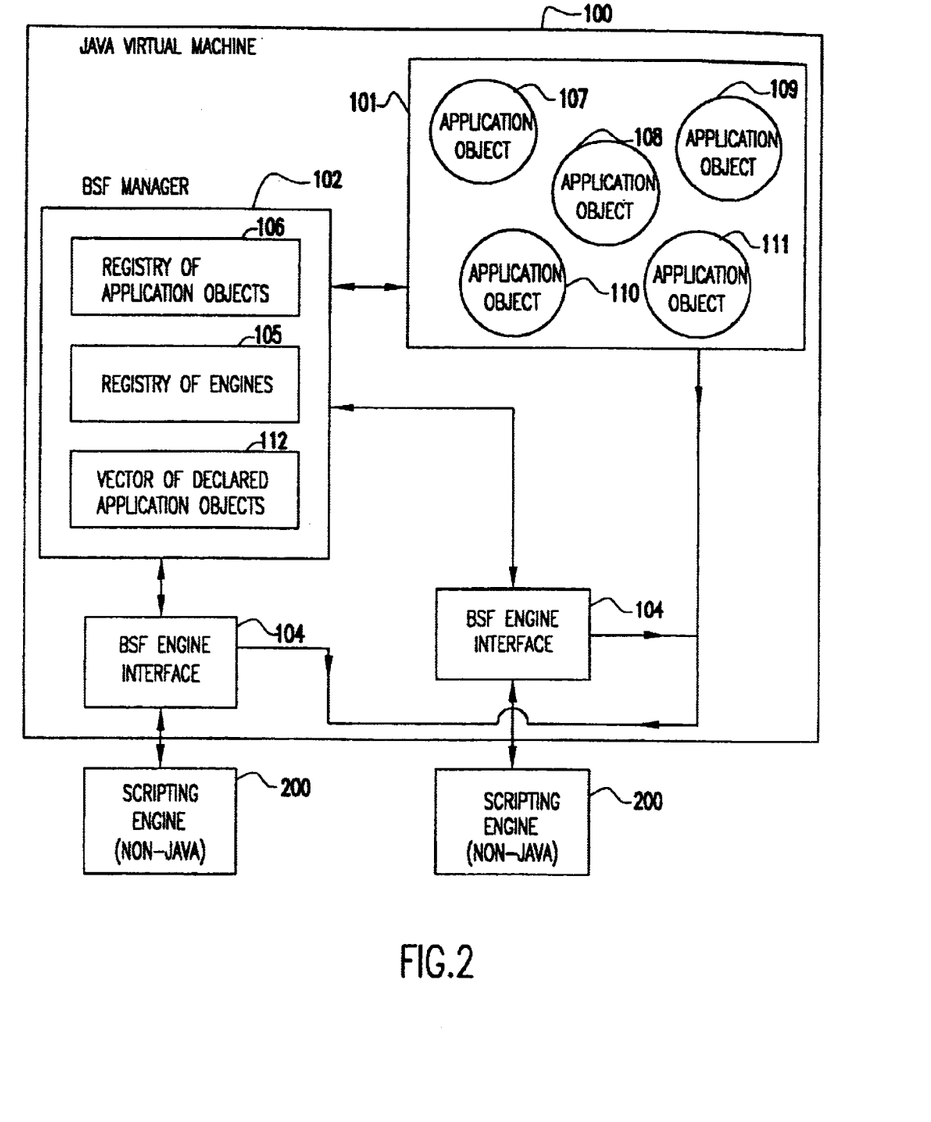
FIG. 2 is a block diagram illustrating the interaction between the implementation of the BSFEngine interface and a scripting engine when the scripting language is not implemented in Java.

Scripting engines 103 must implement the BSFEngine interface 104 to become part of the BSF architecture. The BSFEngine interface 104 is the abstraction that the BSF architecture uses to interact with the scripting engines 103, 200. The interaction between the scripting engine and the BSFManager 102 consists of calls from the BSFManager 102 to the BSFEngine interface 104 to evaluate and execute scripts and calls from the BSFEngine interface 104 to the BSFManager 102 to look up, register and unregister application objects. If the scripting engine 200 itself is not implemented in Java, then the implementation of the BSFEngine interface 104 interacts with the scripting engines 200 using the Java Native Interface (JNI). FIG. 2 illustrates this case.

The application 101, consisting of the collection of objects (107, 108, 109, 110, 111) interacts with the BSFManager 102 or with the BSFEngine objects directly.

FIG. 2 is a block diagram illustrating the principal components of the preferred embodiment of the present invention when the scripting engine is not implemented in Java. FIG. 2 is almost the same as FIG. 1, except that the scripting engines 200 run outside of the JVM 100.

Figure 3:
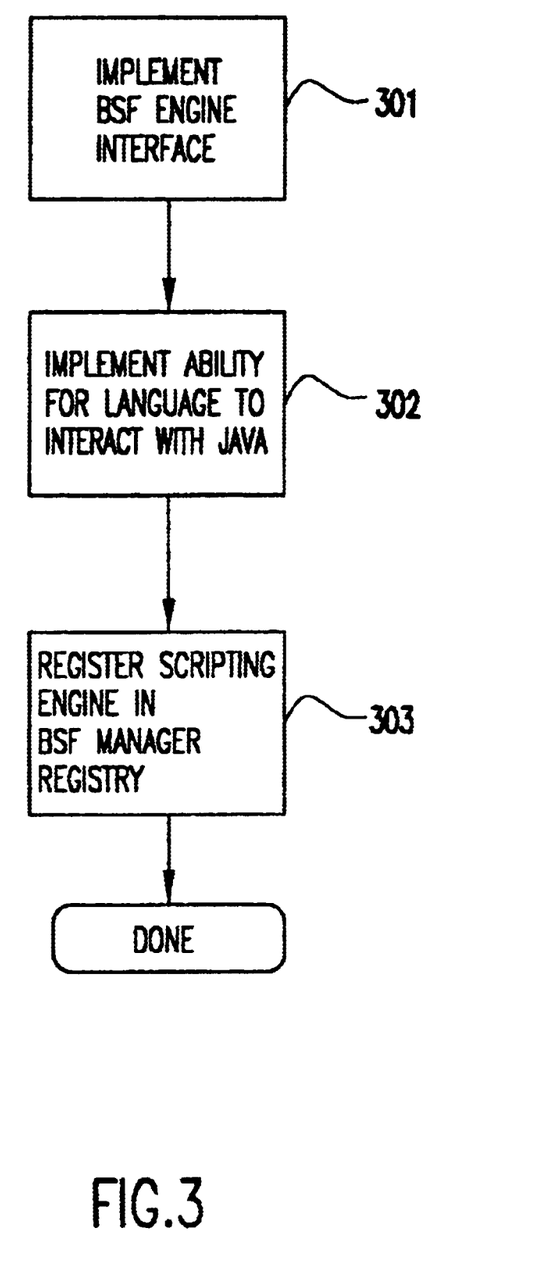
FIG. 3 is a logical flow diagram illustrating the process of integrating a new scripting language to BSF.

FIG. 3 is a logical flow diagram illustrating the process of integrating a new scripting language to the BSF. The first step is to implement the BSFEngine interface 104, as shown in block 301. Specifically, the BSFEngine interface 104 enables each scripting engine 103, 200 to interact with the BSFManager 102 and the application 101. In step 302, the BSFEngine interface 104 must implement functionality in the language to interact with Java, primarily to allow the script author to access the object registry 106 and then to perform operations on objects (107, 108, 109, 110, 111) accessed via the object registry 106. In step 303, the implementation of the BSFEngine 104 must be registered with the scripting engine registry 105 of the BSFManager 102, thus completing the process of integrating a new engine to BSF.

Figure 4:
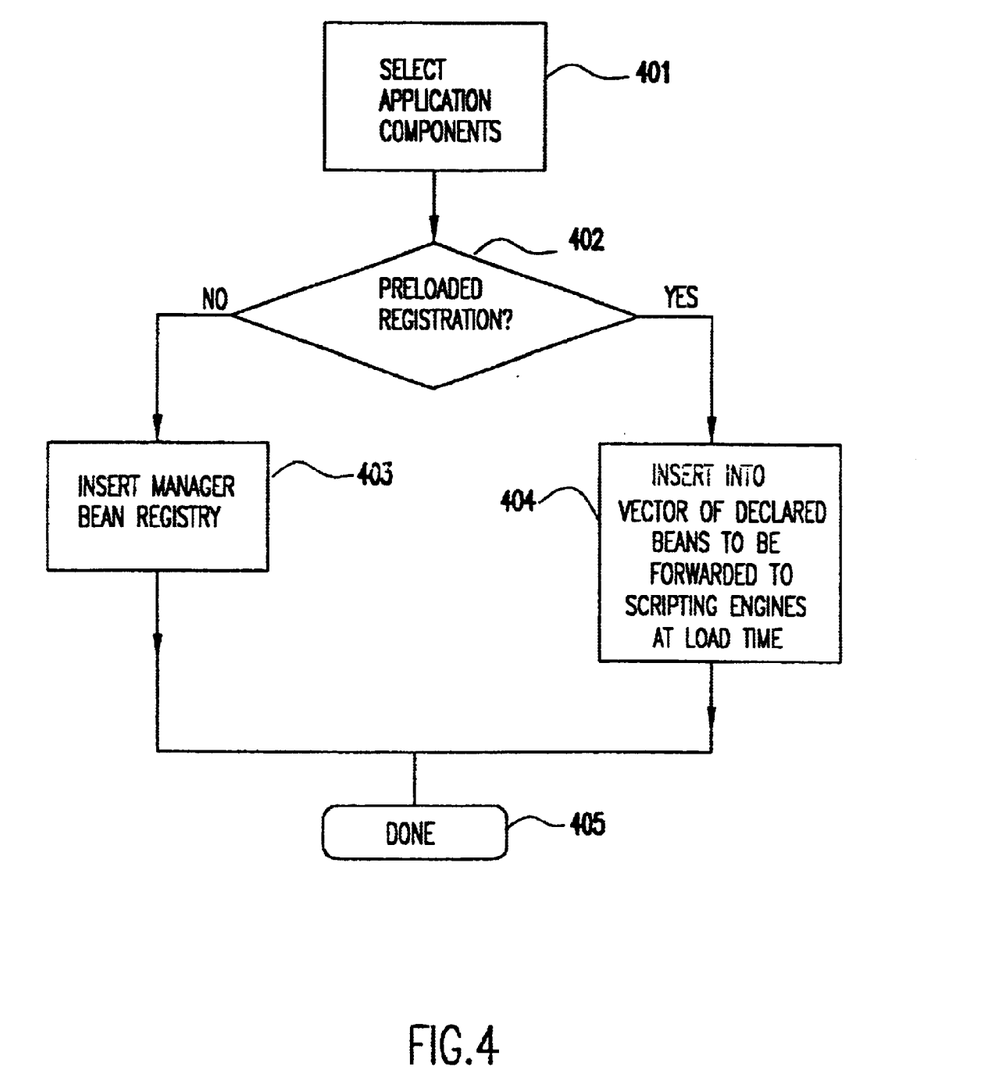
FIG. 4 is a logical flow diagram illustrating the process of making application components available for scripting by BSF supported languages.

FIG. 4 is a logical flow diagram illustrating the process of making application objects (or components) 107, 108, 109, 110, 111 available for scripting. As shown in block 401, the first step is to identify the application components (beans) that are to be made available for scripting. The components are typically identified manually by deciding what functionality of the application is to be made available for scripting. This process is similar to designing the external application programming interfaces (APIs) of an application. In decision block 402, a test is made to decide whether this bean is to be made available in scripting languages as a pre-loaded bean (i.e., one where the user does not have to explicitly load it) or simply as a registered bean. If the bean is not already registered, the bean is registered into object registry 106, as shown in block 403. If the bean is already registered, then the bean is inserted into the BSFManager's vector of declared beans to be forwarded to each scripting engine 103, 200 when they are loaded, as shown in block 404. In step 405, the process terminates.

Figure 5:
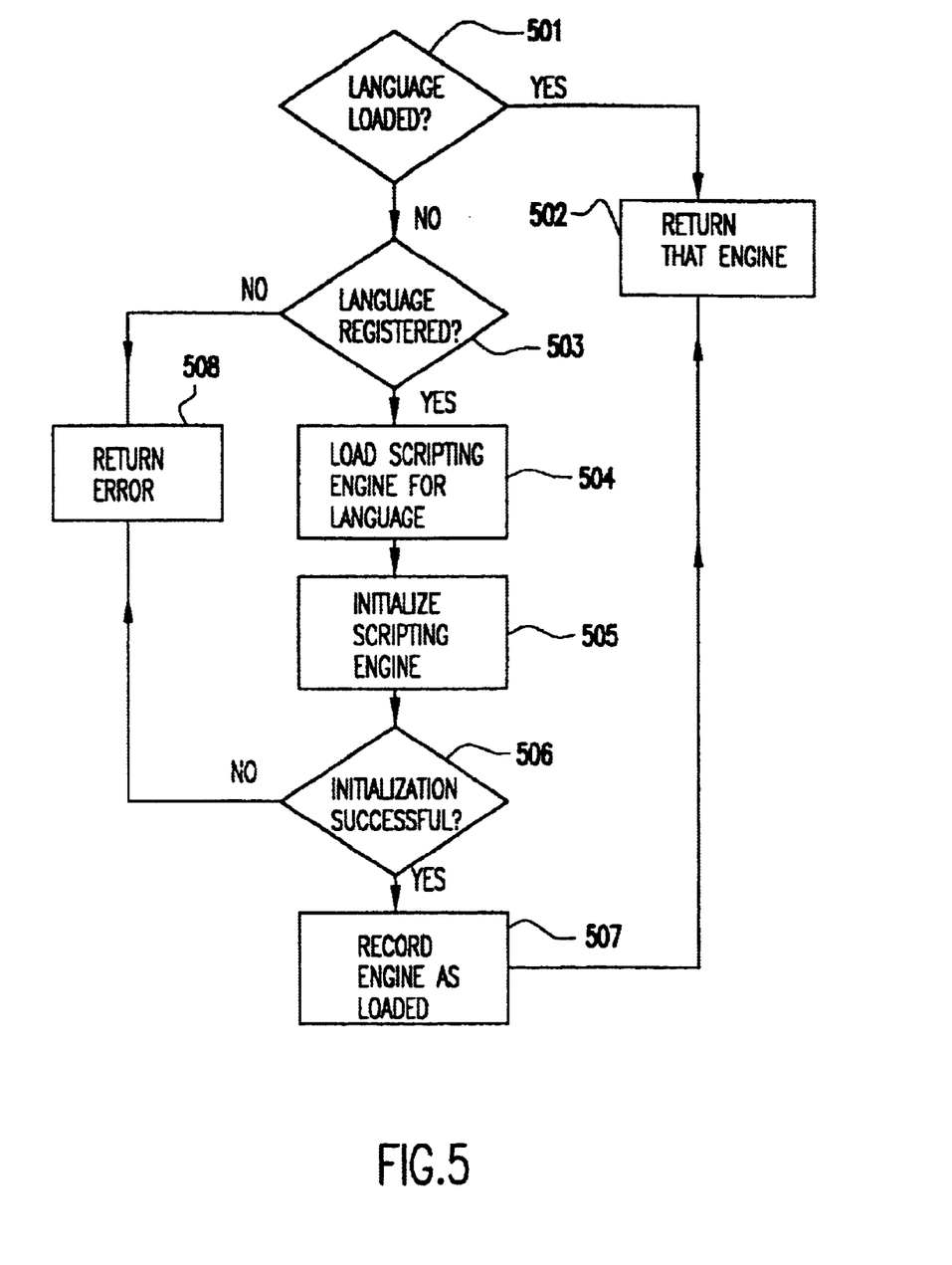
FIG. 5 is a logical flow diagram illustrating the process of loading a scripting language to the BSF.

FIG. 5 is a logical flow diagram illustrating the process of loading a scripting language to the BSF. In decision block 501, a test is made to determine whether the language is already loaded to the requestor. If so, that engine is returned to the requester in block 502. If not, another test is made in decision block 503 to determine whether the language is registered with the scripting engine registry 105 of the BSFManager 102. If not an error is returned in block 508. If yes, the scripting engine for that language is loaded in step 504, and subsequently initialized in block 505. Initializing a scripting engine consists of informing the engine of all the declared application objects from vector 112. In decision block 506, a test is made to determine whether the initialization was successful. If the initialization was not successful, an error is returned in 508. If yes, the fact that the engine was loaded is recorded in the scripting engine registry 105 of the BSFManager 102 in block 507. Then, in block 502 that engine is returned to the application program.

Figure 6:
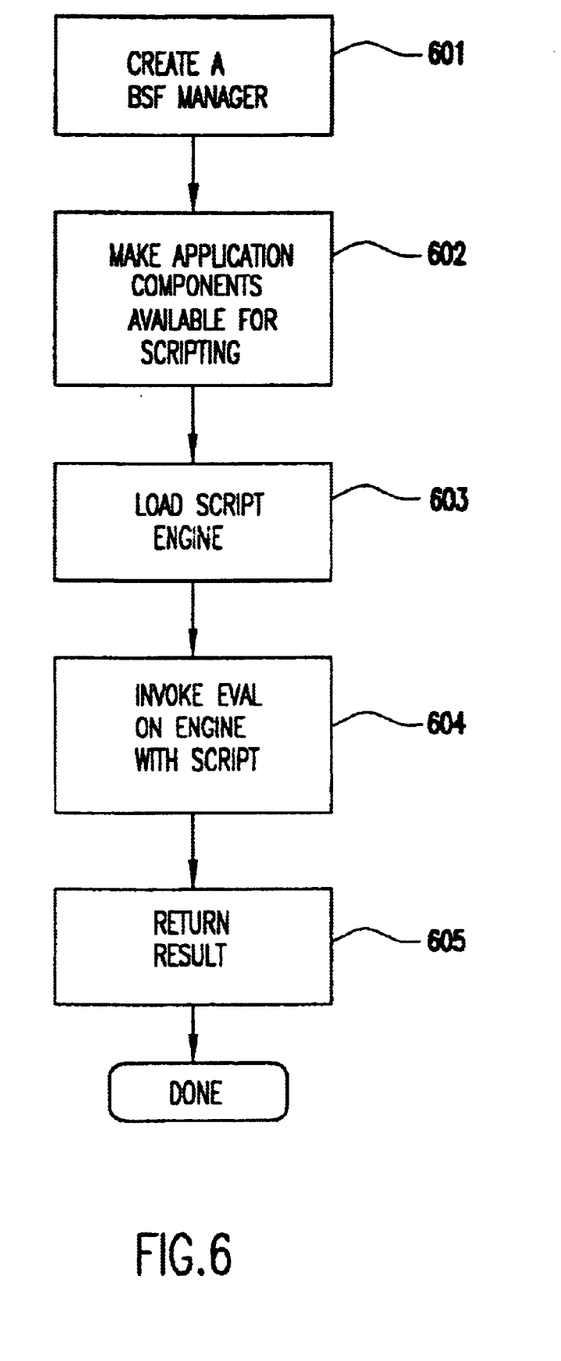
FIG. 6 is a logical flow diagram illustrating the process of running scripts from an application by loading specific engines.

FIG. 6 is a logical flow diagram illustrating the process of loading a scripting engine and running a script from an application. First, in block 601, an instance of a BSFManager 102 is created. In block 602, any application components (107, 108, 109, 110 and 111) that are to be made available for scripting are made available using the process illustrated in FIG. 4. In block 603, the desired scripting language is loaded into the BSFManager 120 using process illustrated in FIG. 5. In block 604, the desired scripts are executed using the appropriate method of the BSFEngine 104, Finally, in block 605 the result, if any, of executing the script is returned to the requestor.

Figure 7:
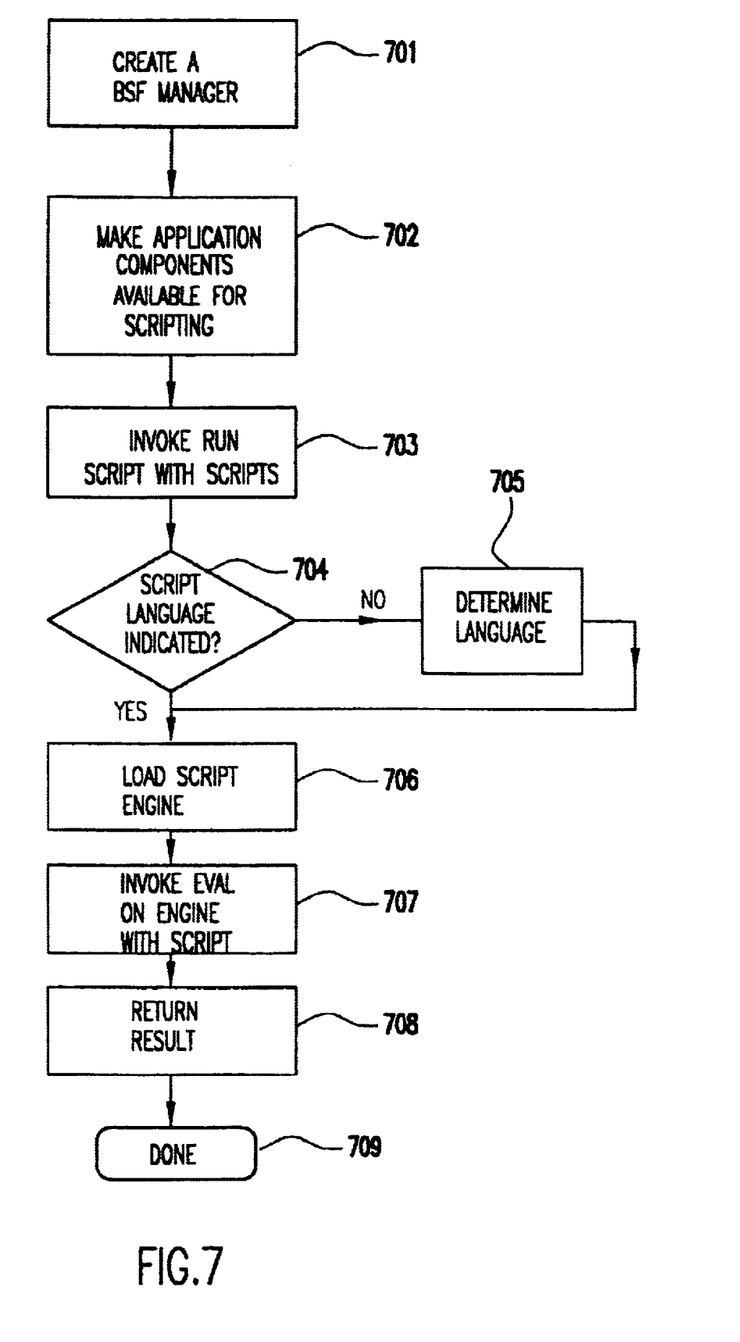
FIG. 7 is a logical flow diagram illustrating the process of running scripts from an application via the BSFManager.

FIG. 7 is a logical flow diagram illustrating the process of running scripts from an application directly using the BSF-Manager. First, an instance of a BSFManager 102 is created by the application program in block 701. In block 702, any application components (107, 108, 109, 110 and 111) that are to be made available for scripting are made available using the process illustrated in FIG. 4. In block 703, the desired scripts are executed using the appropriate method of the BSFManager 102. In decision block 704, a test is made to determine whether the script language has been specified. If not, the language is determined in 705. If yes, or after block 705, the scripting engine 103, 200 is loaded into the BSF-Manager 102, as shown in block 706. In block 707, the desired scripts are executed using the appropriate method of the BSFEngine interface 104, Finally, in block 708 the result, if any of executing the script is returned.

Figure 8:
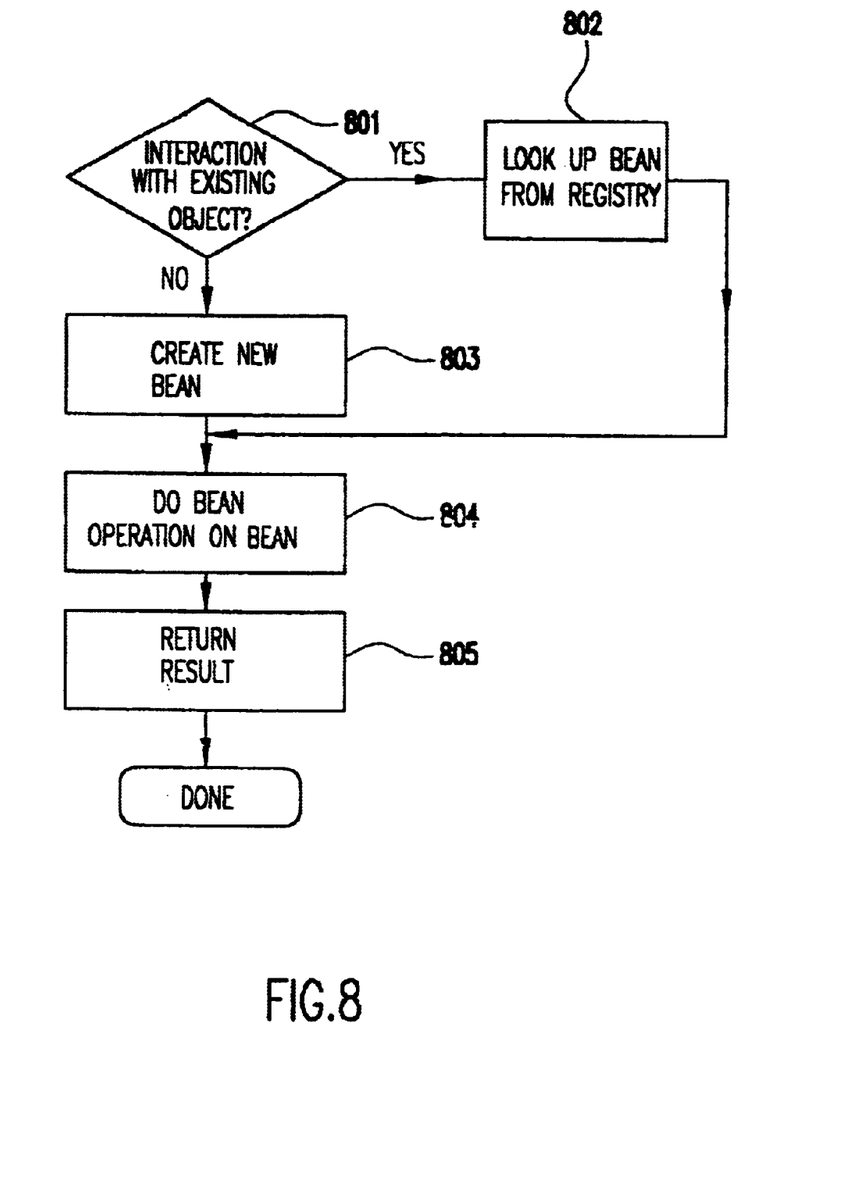
FIG. 8 is a logical flow diagram illustrating the process of interacting with Java from scripts for Java-based scripting engines.

FIG. 8 is a logical flow diagram illustrating the process of interacting with Java from scripts for Java-based scripting engines. In decision block 801, a test is made to determine whether the interaction is with an existing object (107, 108, 109, 110, 111). If yes, the object is looked up from object registry 106 of the BSFManager 102, as shown in block 802. If not, a new object is created in block 803. The appropriate bean operation is performed by the application program in block 804, where the valid operations are setting and getting properties, calling methods and binding events to scripts. The result, if any, of the operation is returned in 805.

Figure 9:
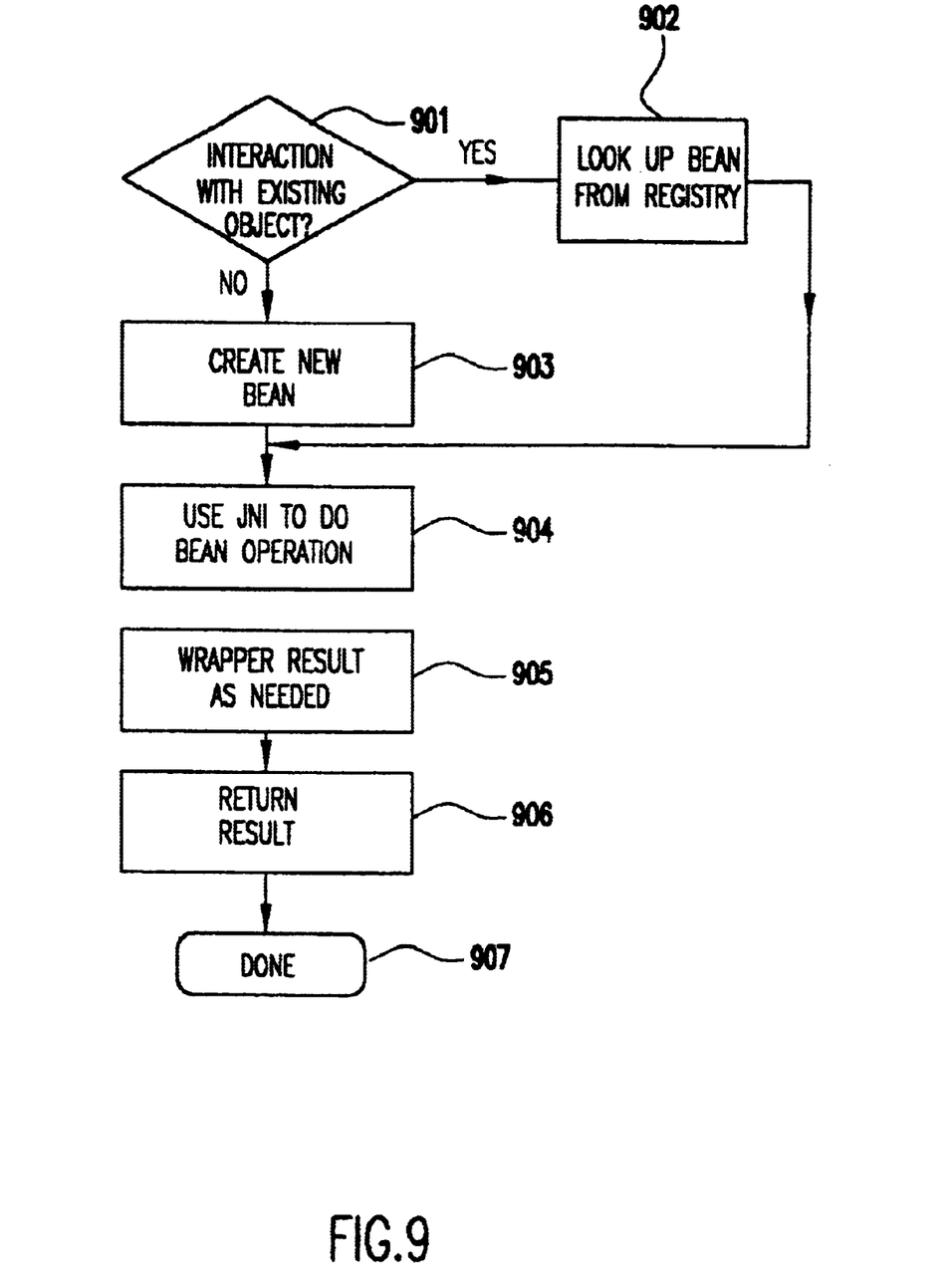
FIG. 9 is a logical flow diagram illustrating the process of interacting with Java from scripts for non-Java based scripting engines.

FIG. 9 is a logical flow diagram illustrating the process of interacting with Java from scripts for non-Java based scripting engines. In decision block 901, a test is made to determine whether the interaction is with an existing object (107, 108, 109, 110, 111). If yes the object is looked up from object registry 106 of the BSFManager 102, as shown in block 902, and a reference to the object is returned to the scripting engine 200. If no, a new object is created in block 903, and a reference to the new object is returned to the scripting engine 200. In a preferred embodiment, the object references returned to non-Java scripting engines 200 are opaque handles, that are of a valid type and value for the scripting language, and which bean operation functions can identify as being references to actual Java objects. The appropriate bean operation is performed in block 904 using the Java Native Interface (JNI), where the valid operations are setting and getting properties, calling methods and binding events to scripts. The result, if any, of the operation is wrapped up into a type that is acceptable to the scripting engine 200, as shown in block 905 and returned in block 906.

The following code samples show the steps involved with incorporating the BSF into an application:

```
import com.ibm.bsf.*;                                    (1)

class YourClass{                                          (2)

BSFManager mgr=new BSFManager ( );                    (3)

. . .                                                 (4)

}                                                         (5)
```

Lines 1–5 above declare and create a BSF manager.

```
String[ ] extensions={"pos"}                              (6)

mgr.registerScriptingEngine ("potatoscript",              (7)

edu.purdue.cs.bsf.engines.potatoscript.                   (8)

extensions);                                              (9)
```

Lines 6–9 above register any new scripting language.

```
mgr.registerBean ("myFrame", myFrame);                    (10)

mgr.registerBean ("myOtherBean", myOtherBean);            (11)

mgr.declareBean ("response", response, response.getClass( ));  (12)
```

Lines 10–12 above register or declare any beans to be made available to scripting engines with appropriate names. Note that any Java object (i.e. any bean) can be made available for scripting. There is no need for the object to implement any specific interface.

```
BSFEngine rhinoEngine=mgr.loadScriptingEngine
    ("javascript");                                       (13)
```

Line 13 may be used to load any desired scripting engine.

```
object result=rhinoEngine.eval ("testString", 0, 0, "2+32");  (14)

result=rhinoEngine.call (null, "hello", null);            (15)

rhinoEngine.exec ("testString2", 0, 0, "hello ( )");      (16)
```

Lines 14–16 call functions in the script or evaluate/execute arbitrary scripts.

```
object result=mgr.eval ("javascript", "testString", 0, 0,
    "2+32");                                              (17)

mgr.exec ("javascript", "testString", 0, 0, "hello( )");  (18)
```

Lines 17–18 show an example where the BSF manager can run any script directly.

While the invention has been described in terms of a single preferred embodiment, those skilled in the art will recognize that the invention can be practiced with modification within the spirit and scope of the appended claims.

What is claimed is:

1. A system for incorporating language independent scripting into object oriented programming language applications and applets, comprising:

a plurality of application objects associated with an application program;

a plurality of scripting engines, each said scripting engine integrating a scripting language into the system;

scripting engine management means for registering said plurality of application objects and for registering said plurality of scripting engines, allowing objects registered with the scripting engine management means to be manipulated from a scripting language by making calls to those objects via scripts; and interfacing means associated with each of said plurality of scripting engines for implementing a functionality in each of said plurality of scripting engines that enables each said scripting engine to interact with the object oriented programming language of the application program, whereby individual objects in one environment may be arbitrarily manipulated by scripts in another environment without burdening the application program with knowledge specific to any of said plurality of scripting languages, thereby providing scripting language transparency between said individual objects and said scripts, wherein said functionality does not include a generic event listener able to to pass events between a source and sink without them knowing about each other.

2. The system recited in claim 1, wherein said interfacing means further allows a script to access the registered application objects and then to perform operations on the objects.

3. The system as recited in claim 1, wherein said scripting engine is implemented inside a Java Virtual Machine (JVM).

4. The system as recited in claim 1, wherein the object oriented programming language is Java.

5. The system as recited in claim 1, wherein said scripting engine is implemented outside of a JVM.

6. The system as recited in claim 5, wherein said scripting engine means is implemented in a non-Java language and wherein said means for interfacing interacts with said scripting engine means by using a Java Native Interface (JNI).

7. A method for incorporating language independent scripting into object oriented programming language applications and applets, comprising the steps of:

making a plurality of application objects available for scripting;

identifying the application objects that are to be made available for scripting;

registering the application objects that are to be made available for scripting in a registry of application objects;

loading a plurality of scripting languages;

registering the loaded scripting languages in a scripting language registry;

forwarding an application object to a scripting engine;

loading the application object in the scripting engine; and running a script utilizing a scripting language registered in the scripting language registry to manipulate registered objects from said scripting language by making calls to those objects via scripts, whereby individual objects in one environment may be arbitrarily manipulated by said scripts in another environment without burdening the registered application objects with knowledge specific to said scripting language, thereby providing scripting language transparency between said individual objects and said scripts, wherein said arbitrary manipulation does not include passing events between a source and sink without them knowing about each other.

8. The method as recited in claim 7, wherein the step of loading a scripting language to a scripting language registry comprises the steps of:

determining whether the scripting language is already loaded, and loading the scripting language if it has not been loaded, or returning the scripting engine if it is already loaded;

initializing the scripting engine; and returning the scripting engine.

9. The method as recited in claim 7, further comprising the step of determining whether the scripting language is registered with a scripting engine registry, and loading the scripting engine if it is registered and returning an error if the scripting engine is not registered.

10. The method as recited in claim 7, wherein the script is run directly from the scripting engine.

11. The method as recited in claim 7, wherein the script is run in accordance with the following steps:

loading a desired scripting language into a Bean Script Framework Engine (BSFEngine) comprising a script registry and an registry of application objects;

executing a desired script by utilizing an appropriate method of the BSFEngine; and returning the result of the executed script.

12. The method as recited in claim 7, further comprising the steps of:

determining whether an application object already exists and, if so, looking up the existing object from an object registry, or otherwise creating a new object;

performing a bean operation on the object; and returning a result of the operation.

13. The method as recited in claim 12, wherein the operations comprise at least one of setting and getting properties, calling methods, and binding events to scripts.

14. The method as recited in claim 7, further comprising the steps of:

determining whether an application object already exists and, if so, looking up the existing object from an object registry and returning an object to the scripting engine, or otherwise creating a new object and returning an object to the scripting engine;

performing a bean operation on the object using the Java Native Interface, or equivalent; and returning a result of the operation.

15. The method as recited in claim 14, wherein the object references returned opaque handles, that are of a valid type and value for the scripting language, and which bean operation functions can identify as being references to actual Java objects.

16. The method as recited in claim 14, wherein the operations comprise setting and getting properties, calling methods and binding events to scripts.

17. The method as recited in claim 14, wherein the returned result is wrappered up into a type that is acceptable to the scripting engine.

* * * * *